Feb. 28, 1956 P. W. MODLIN 2,736,136
BICYCLE NOISEMAKER
Filed July 27, 1954
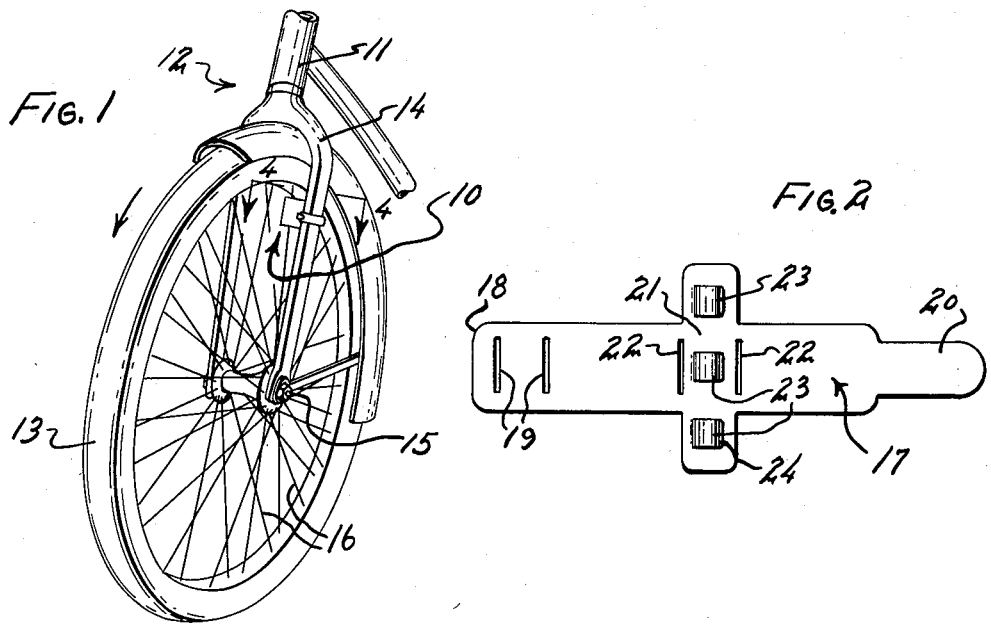
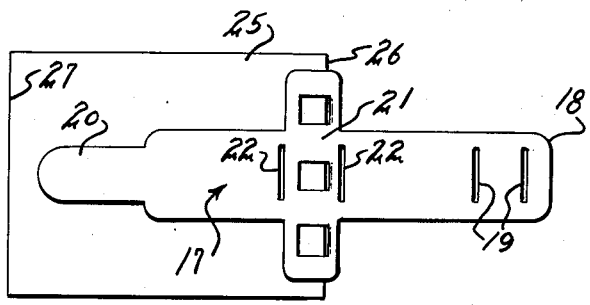
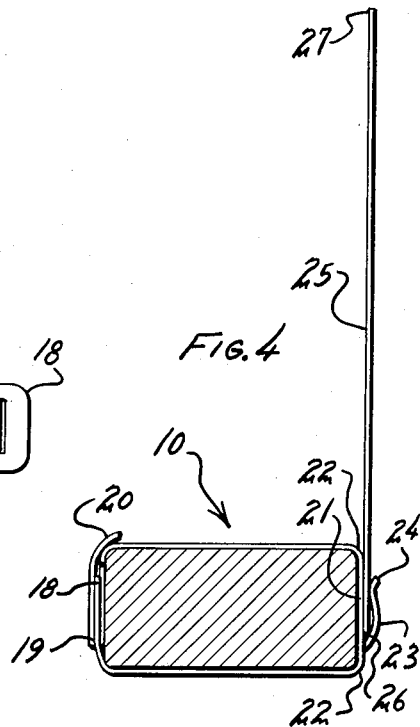
INVENTOR
PHILIP W. MODLIN
BY Williamson, Williamson,
Schroeder & Adams
ATTORNEYS

United States Patent Office 2,736,136
Patented Feb. 28, 1956

2,736,136

BICYCLE NOISEMAKER

Philip W. Modlin, Minneapolis, Minn., assignor of one-half to Alton O. Juul, Minneapolis, Minn.

Application July 27, 1954, Serial No. 446,050

2 Claims. (Cl. 46—175)

This invention relates to a youth's novelty device and more particularly to an attachment for a bicycle and the like which will impart a noise during travel thereof.

I am aware of certain devices such as sirens which have rotatable elements actuable by driving contact with moving parts of vehicles such as bicycles, but to the best of my knowledge I am the first to conceive of a simple noise producing device which is mountable on the frame structure of a vehicle having spoked wheels in such a manner that the movement of the wheel spokes during travel of the vehicle will produce a noise by direct contact with the spokes.

It is therefore an important object of the invention to provide a noisemaker attachment for bicycles and the like which is simple and inexpensive and which is actuable by direct contact with the wheel spokes in motion to produce the desired noise.

Another object of the invention is to provide a simple attachment for specific location on the vehicle frame which can be easily placed and removed, yet holding securely against accidental rotation a vibrating noise-producing element which in turn extends into the projected pathway of the wheel spokes of the vehicle.

A further object of the invention is to provide a bicycle noisemaking attachment in which a vibrating element is efficiently held against displacement during use but which can be removed and replaced by simple maneuver.

A still further object of the invention is to provide a noisemaker of the class described in which the entire device can be manufactured and transported in sanitary and compact condition, substantially flat and occupying very little volume, and hence adapting itself to inclusion as a premium item with such products as boxed breakfast food or even adapting itself to be sent via mail service in an ordinary flat mailing envelope.

These and other objects and advantages of the invention will more fully appear from the following description made in connection with the accompanying drawing, wherein like reference characters refer to the same or similar parts throughout the several views, and in which:

Fig. 1 is a perspective view of a spoked wheel and associated frame parts in a vehicle such as a bicycle (unessential portions being deleted), my noisemaking device being secured in proper position thereto;

Fig. 2 is a side elevation of the clamping mount and fastening element of my invention in flat and extended position;

Fig. 3 is another side elevation of the device taken from the reverse side to that shown in Fig. 2 and with a stiff card fastened thereto; and Fig. 4 is a cross-sectional view taken on the line 4—4 of Fig. 1 and looking in the direction of the arrows.

With continued reference to the drawing, my device is indicated generally at 10 and is adapted to be attached to the frame 11 of a vehicle 12 having a spoked wheel 13. My device is particularly adapted to be attached to the fork 14 of frame 11 closely adjacent the side of wheel 13 and above the axle suspension 15 with the spokes 16 traveling in proximity thereto in a forward direction at the upper portion of the wheel when traveling in a forward direction as shown.

My noisemaking device has a clamping mount in the form of a flat band 17 as shown in Fig. 2. The outer ends of the flat band are constructed for interlocking and for bending around the frame member 14 as shown. The clamping band 17 is preferably constructed of stiff metal sheeting capable of being manually bent but strong enough to resist tearing and breaking. At one end 18 a plurality of transverse slots 19 may be cut through the metal to accommodate a restricted tongue portion 20 formed at the other end of the band. A medial area 21 is somewhat wider than the rest of the band 17 and may be provided with slits 22 which define a bending line so that the area 21 will be pressed against a side edge of the bicycle frame member 14 and held in non-rotatable condition when the interlocking tongue 20 is inserted in one of the slots 19 and crimped against the band to secure it against frame members 14 in the position shown.

The flat medial area 21 has fastening means disposed outwardly from the surface thereof and are preferably in the form of a plurality of clips 23 formed by cutting and offsetting tabs in a U-shaped cut from the medial area 21. The clips 23 may be formed with a reverse bend at the outer end 24 so as to accommodate the noisemaking card or sheet 25 as shown in Figs. 3 and 4.

The card or sheet 25 is formed of stiff plastic sheeting or of fibrous material such as cardboard and constitutes a small sheet having a size in the order of a playing card. The sheet or card 25 has an outer edge 26 and an inner edge 27, the outer edge 26 being adapted to be secured in the fasteners 23 in the manner shown in Fig. 3. The band 17 may be constructed of metallic material having sufficient spring properties so that the clips or tabs 23 will firmly hold the card 25 in the position shown but will release the card when it is pulled outwardly from the fastening slips in an outward direction away from the medial area 21 of the clamping band.

It will be noted that the clamping band 17 with its spring clips or tabs 23 and the card 25 mounted therein, constitutes a substantially flat device which has no appreciable volumetric displacement and hence lends itself to inclusion as a premium in boxed material such as breakfast food.

In the use and operation of my noisemaker, the band 17 is placed in the position shown in Fig. 1 at the side of a vehicle frame member 14 and adjacent the spoke members 16 of wheel 13. The flat medial area 21 will then be in contact with the rearward or trailing edge of member 14 and the tongue 20 will be bent around to meet one of the slots 19 for interlocking engagement therewith. The tongue 20 is then bent in crimped position, as shown in Fig. 4, with the medial area 21 lying in flat engagement with the trailing edge of frame member 14. The sharp bend at slits 22 will aid in creating a flat contact to prevent turning of the clamping mount when in the position shown. The tabs 23 constituting the card fastening means will have their open card-receiving ends facing inwardly toward the wheel spokes 16. The card or sheet 25 will then have its outer edge 26 disposed beneath the ends of the clips 23 so that the card will have a portion of its area lying in flat contact with the medial band area 21. The inner edge 27 of card or sheet 25 will lie freely within the projected path of the spokes 16 and will be engaged by a plurality of the spokes for every revolution of wheel 15. The card or sheet 25 is held firmly in its lateral position and presents a stiff resistance to the spokes while having sufficient flexibility to yield as each spoke passes it. Since the card or sheet 25 lies in flat relation against the medial area 21 and since the vibrational force imparted by the traveling spokes work laterally of the mount, the card or sheet 25 will be maintained firmly in clipped relation to the fasteners 23 while the device is in use. When it is desired to replace the card or sheet 25 or to render the device non-operative, the card or sheet is merely pulled inwardly of its mounted position through the spokes 16 so as to become disengaged from the fastening clips 23. A replacement card or sheet 25 may be clipped into position by the reverse procedure.

Although the card or sheet 25 is small and of light construction, it will create an appreciable amount of noise, the pitch of which increases with increased speed of the vehicle 12. It may thus be seen that I have devised a novel noisemaking device designed particularly for use in conjunction and cooperation between a vehicle frame member adjacent the spoked wheels thereof to produce a noise during the travel of the vehicle.

It will, of course, be understood that various changes may be made in the forms, details, arrangement and proportion of the various parts without departing from the scope of my invention.

What I claim is:

1. A noisemaker for vehicles with spoked wheels comprising, an elongated clamping band having a pair of spaced traversely formed bending slits defining a medial area therebetween and abutting firmly at the medial area against the trailing edge of a bicycle frame member adjacent the spokes of a wheel thereof during use, the ends of the elongated band being bent convergently at the bending slits and secured together at the leading edge of said frame member, said medial area being provided with outwardly off-set clamp means formed from the flat band material, and a stiff flexible card removably clamped in flat relation with respect to the outer surface of said band, said card when mounted together with said clamping band to the vehicle frame, lying firmly positioned against displacement and projecting laterally into the pathway of the spokes of said adjacent wheel whereby to produce a noise during travel of said vehicle and said wheel spokes.

2. The subject matter of claim 1 wherein said clamp means are fastened adjacent the outer edge of the medial area and extend toward the wheel to terminate adjacent the inner edge of said medial area, and said card lying in flat marginal contact with the medial area and secured against turning with respect to said bicycle frame member during turning of said wheel and resultant application of torque to said card and clamping band.

References Cited in the file of this patent

UNITED STATES PATENTS

| | | |
|---|---|---|
| 1,109,394 | Bourne | Sept. 1, 1914 |
| 1,232,976 | Rees | July 10, 1917 |
| 1,490,882 | Anderson | Apr. 15, 1924 |
| 1,865,241 | Dock | June 28, 1932 |
| 1,871,064 | Kipper | Aug. 9, 1932 |
| 2,624,156 | Meyer | Jan. 6, 1953 |
| 2,667,720 | Connell | Feb. 2, 1954 |